United States Patent Office 3,290,343
Patented Dec. 6, 1966

3,290,343
ORGANOMETALLIC COMPOUNDS CONTAINING FLUOROCARBON RADICALS
Francis G. A. Stone, Watertown, Mass., and Paul M. Treichel, Madison, Wis., assignors to Ethyl Corporation, New York, N.Y., a corporation of Virginia
No Drawing. Filed Sept. 1, 1961, Ser. No. 135,462
17 Claims. (Cl. 260—429)

This invention relates to novel organometallic compounds and the method for their preparation. More particularly, this invention relates to fluorocarbon Group VB to VIII metal transition compounds wherein a —$CF_2$— group is bonded directly to the metal atom.

An object of this invention is to provide a novel class of organometallic compounds. A further object is to provide a novel class of organometallic compounds of Group VB, VIB and VIII metals wherein a fluorocarbon is bonded through a —$CF_2$— group to the metal atom. A further object of this invention is to provide stable and useful fluorocarbon organometallic compounds.

An object of this invention is to provide a process of wide applicability for the preparation of novel organometallic compounds. A further object is to provide a process for the preparation of fluorocarbon Group VB to VIII metal compounds which comprises reacting an unsaturated fluorocarbon with a Group VB to VIII metal hydride. Other objects will become apparent from the following discussion.

The objects of this invention are accomplished by providing organometallic compounds of Group VB to Group VIII transition metals in which one or more fluorocarbon radicals are sigma bonded to a Group VB to VIII metal atom. The novel compounds of this invention can be represented by the formula:

$$[R]_a[R']_bM[CO]_c[R''_3P]_d$$

wherein R is a fluorocarbon radical selected from the class consisting of

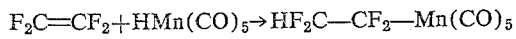

R' is a cyclopentadienyl radical selected from the class consisting of the cyclopentadienyl radical and hydrocarbon substituted cyclopentadienyl radicals having 6 to 13 carbon atoms which embody a ring of 5 carbon atoms having the general configuration found in cyclopentadiene, M is a metal selected from the class consisting of Groups VB, VIB, and VIII of the Periodic Table and R" is selected from the class consisting of halogen and alkyl, cycloalkyl, aryl, alkaryl and aralkyl hydrocarbon radicals having from one to about 13 carbon atoms, $a$, $b$, $c$, and $d$ are integers such that $a=1$ to 3, $b=0$ to 2, $c=0$ to 5 and $d=0$ to 2, the values of $a$, $b$, $c$ and $d$ being such that the sum of all the electrons coordinated to the metal and the atomic number of the metal is equal to the atomic number of the next higher inert gas.

Most of the fluorocarbon derivatives of the transition metals prepared by the process of this invention are air stable and unaffected by moisture, and the fluorocarbon groups are only partially removed by aqueous base or acid at elevated temperature.

The fluorocarbon radical bonded to the transition metal atom in the compounds of this invention are represented by R in the above formula. These fluorocarbon radicals are formed from the corresponding unsaturated fluorocarbons, tetrafluoroethylene, trifluorochloroethylene, 1,1-difluoro-2,2-dichloroethylene, 1,1,1,4,4,4-hexafluorobutyne-2.

The process of our invention comprises the hydrometallation of these above named unsaturated fluorocarbons. Generically, the process may be considered to be the addition of metal hydride across the double bond of the unsaturated fluorinated hydrocarbon, $$F_2C=CF_2+HMn(CO)_5 \rightarrow HF_2C-CF_2-Mn(CO)_5$$

Specifically, our process is a process for the formation of the new compounds of the Group VB, VIB, VIIB and VIII metals of the Periodic Table which comprise reacting (a) an olefin selected from the class consisting of tetrafluoroethylene, trifluorochloroethylene, 1,1-difluoro-2,2-dichloroethylene, and 1,1,1,4,4,4-hexafluorobutyne-2, with
(b) a hydride of a Group VB, VIB, VIIB and VIII metal having the formula $$[R']_bM[CO]_c[R''_3P]_d[H]_e$$

wherein R' is a cyclopentadienyl radical selected from the class consisting of the cyclopentadienyl radical and hydrocarbon substituted cyclopentadienyl radicals having 6 to 13 carbon atoms which embody a ring of 5 carbon atoms having the general configuration found in cyclopentadiene, M is a metal of Group VB, VIB, VIIB and VIII of the Periodic Table, R" is selected from the class consisting of halogen, and alkyl, cycloalkyl, aryl, alkaryl, and aralkyl hydrocarbon radicals having from one to about 13 carbon atoms, $b$, $c$, $d$ and $e$ are integers such that $b=0$ to 2, $c=0$ to 5, $d=0$ to 2 and $e=1$ to 3, the values of $b$, $c$, $d$ and $e$ being such that the sum of all the electrons coordinated to the metal and the atomic number of the metal is equal to the atomic number of the next higher inert gas, said process being carried out at a temperature of 0 to 80° C., and at a pressure of 0.3 to 10 atmospheres for 5 hours to 7 days.

Variables in our reaction include the starting materials; namely, the fluorinated unsaturated hydrocarbon and the metal hydride as well as process variables, e.g., the temperature, pressure, time, solvent and product separation techniques. These variables are discussed in turn in the paragraphs immediately following.

We have found the above named unsaturated fluorocarbons; namely, tetrafluoroethylene, trifluorochloroethylene, 1,1-difluoro-2,2-dichloroethylene and 1,1,1,4,4,4-hexafluorobutyne-2, to be the only unsaturated fluorocarbons applicable in our process. The reason for this is not clear, since olefins having a closely analogous structure do not yield a fluorocarbon metal compound when the reaction conditions of our process are employed. It is rather difficult, therefore, to make many generalizations as to which unsaturated fluorocarbons other than those mentioned above are applicable, and it seems that our unique process is specific for the above named olefins. Certain generalizations are possible, however, and they are, namely, fluorinated unsaturated hydrocarbons containing hydrogen, and olefins containing a ($CF_3$—C=) are not applicable.

However, our process is applicable to a wide variety of metal hydrides. These compounds, which are applicable, fall into three general classes. The first of these classes are those that contain hydrogen, a Group VB to VIII metal, and carbon monoxide. Preferred compounds of this type of metal hydride are manganese pentacarbonyl hydride, rhenium pentacarbonyl hydride, iron tetracarbonyl dihydride, ruthenium tetracarbonyl dihydride, osmium tetracarbonyl dihydride, cobalt tetracarbonyl hydride, ruthenium tetracarbonyl hydride, iridium tetracarbonyl hydride, and dinickel tricarbonyl dihydride. The most preferred compound of this class is manganese pentacarbonyl hydride because that compound is readily prepared by acidification of sodium manganese pentacarbonyl (which in turn is prepared from sodium amalgam and manganese carbonyl in tetrahydrofuran) and has fairly high thermal stability compared to most of the transition metal carbonyl hydrides. Though it is air sensitive, it can be handled easily in a conventional high vacuum apparatus.

The second class of metal hydrides applicable in our process are those that contain a cyclopentadienyl radical. The cyclopentadienyl radical designated by the symbol R' in the formula presented above comprises a cyclomatic radical, that is, a cyclopentadienyl moiety. In general, such cyclomatic hydrocarbon groups can be represented by the formulae:

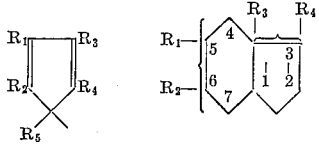

where the R's are selected from the group consisting of hydrogen and univalent organic hydrocarbon radicals.

A preferred class of cyclomatic radicals suitable in the practice of this invention are those which contain from 5 to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. The compounds containing these radicals are preferred as they are the more readily available cyclomatic compounds and the metallic cyclomatic fluorocarbon compounds obtainable from them have the more desirable characteristics of volatility and solubility which are prerequisites of superior hydrocarbon additives and vapor phase metal plating.

The preferred compounds in this class of applicable reactants are cyclopentadienyl tantalum trihydride, cyclopentadienyl chromium tricarbonyl hydride, cyclopentadienyl molybdenum tricarbonyl hydride, dicyclopentadienyl molybdenum dihydride, cyclopentadienyl tungsten tricarbonyl hydride, dicyclopentadienyl tungsten dihydride, dicyclopentadienyl rhenium hydride, cyclopentadienyl and iron dicarbonyl hydride. These compounds are preferred because of their availability and their stability under our process conditions. They generally are stable in air and consequently are easily substituted with a fluorocarbon radical by our process without elaborate precautions.

The third class of metal hydride applicable in our hydrometallation process include those compounds which do not contain a cyclopentadienyl ring but which contain ligands other than a carbonyl group. These compounds are exemplified by the following list: diphenylphosphine cobalt tricarbonyl hydride, bis(diphenylphosphine)palladium chloride hydride, and bis(triethylphosphine)platinum chloride hydride. In these compounds the hydrocarbon radicals bonded to the phosphorus atom in the phosphine ligand can be either alkyl, cycloalkyl, aralkyl, or alkaryl radicals. Of these compounds the palladium and platinum compounds mentioned above are most preferred because through the use of our process, new and useful compounds of these noble metals can be prepared.

From the above discussion it is apparent that our process is applicable to a wide variety of Group VB to VIII metal hydrides. The only limiting factor in the choice of a suitable hydride is the thermal stability of that compound. Some metal hydrides are so thermally unstable that they decompose so rapidly that the fluorocarbon metal compounds cannot be prepared in high yield. Therefore, we prefer to use those metal hydrides which are stable under the conditions of the reaction employed in our hydrometallation process. Therefore, the most preferred metal hydride applicable in our process is manganese pentacarbonyl hydride.

Our process can be performed with or without the presence of a solvent. When a solvent is used, an unreactive hydrocarbon solvent is preferred. An illustrative but not limiting list of these hydrocarbon solvents is n-pentane, n-hexane, isooctane, and petroleum ether.

Our process can be conducted at a temperature within the range of 15° to 80° C. A preferred temperature range is 20° to 65° C. Temperatures higher than 80° C. cause extensive decomposition and undesirable side reactions which reduce the yield of the desired product. Temperatures lower than 15° C. unduly prolong the reaction time.

Our process is applicable when pressures within the range of 0.3 to 10 atmospheres are employed. A preferred pressure range is from 5 to 8 atmospheres. Higher pressures can cause violent decomposition of the unsaturated fluorinated hydrocarbons. Lower pressures unduly prolong the reaction time.

The reaction time used in our process is not a truly independent variable. If a relatively low temperature and pressure are employed, the reaction time will be extended. If a high temperature and pressure are used, the reaction time will be correspondingly diminished. We prefer to employ reaction conditions in which the reaction time falls within the range of ten hours to seven days. A most preferred reaction time is 20 hours to six days.

Agitation of the liquid mixture is preferred since a smoother reaction rate is accomplished. However, agitation is not essential. The agitation may be effected by either stirring the reaction mixture or rocking the reaction vessel.

Our products are readily separable from the reaction mixture by those standard techniques used in the chemical prior art. Liquid products can be removed by distillation or extraction. Solid products can be removed from the reaction mixture by fractional crystallization or sublimation. Both liquid and solid products can be separated by chromatographic techniques. Generally, our products are low melting solids. We prefer to remove them from the reaction mixture by sublimation of the solid residue remaining after the solvent has been removed by distillation.

Our process is illustrated by the following examples. The amounts of reactants and solvents are given in parts by weight per 100 parts by weight and the yields are expressed in percent by weight of the theoretical yield, calculated on the basis of the amount of metal hydride employed, unless otherwise indicated.

EXAMPLE I

*1,1,2,2-tetrafluoroethyl manganese pentacarbonyl*

A mixture of manganese pentacarbonyl hydride, 12.5 parts, tetrafluoroethylene, 12.5 parts, and n-pentane, 75 parts, were charged into a suitable stainless steel pressure vessel equipped with heating means, temperature means, pressure means, stirring means, and gas inlet and outlet ports.

The temperature was maintained at 25° C. and a pressure of 5 atmospheres was initially impressed upon the mixture. The mixture was stirred throughout the reaction period. After 22 hours the vessel was vented to the hood and then opened. The liquid contents were decanted into a suitable distillation vessel.

The pressure vessel was washed with n-pentane until the washings were colorless, and these washings were combined with the liquid reaction mixture. The mixture was then distilled at room temperature and at reduced pressure (20 mm.).

The solid residue was transferred to a suitable subliming apparatus and sublimed at room temperaturre and at 0.1 mm. pressure. The product, 1,1,2,2-tetrafluoroethyl manganese pentacarbonyl, was the most volatile component and was the first fraction deposited on the collection surface. The product, a pale yellow solid, M.P. 30.5–31.5° C., was obtained in yield of 69 percent. An analytical sample was further purified by resublimation.

Calculated for $C_7HF_4O_5Mn$: C, 28.4; H, 0.34; F, 25.6; Mn, 18.6. Found: C, 28.3; H, 0.41; F, 25.38; Mn, 18.91. The molecular weight, determined isopiestically, was 297 grams/mole. The product was further characterized by infrared spectrophotometry. Strong peaks occurred at 4.91, 4.96, 5.07, 7.39, 9.14, 9.88 and 10.09 microns when the sample was run in $CS_2$ and NaCl optics. Nuclear magnetic resonance, $^{19}F$, studies demonstrated two peaks, one at 59.8 p.p.m. and the other at 122.8 p.p.m. On treatment with bromine, tetrafluorobromoethane and carbon monoxide were obtained in quantitative yield.

EXAMPLE II

*1,1,2,2-tetrafluoroethyl manganese pentacarbonyl*

Manganese pentacarbonyl hydride, 43.5 parts, and tetrafluoroethylene, 56.5 parts, were added to a previously evacuated Pyrex bulb and the bulb was then sealed. The pressure inside the bulb when the temperature was 25° C. was 0.6 atmosphere. After 24 hours at 25° C, the bulb was opened carefully, and the liquid mixture decanted into a suitable distillation vessel. The bulb was washed with n-pentane until the washings were colorless. Isolation of the product by the procedure used in Example I yielded the same product as above, 1,1,2,2-tetrafluoroethyl manganese pentacarbonyl, in 45 percent yield.

EXAMPLE III

*1,2,2-trifluoro-1-chloroethyl manganese pentacarbonyl*

The procedure of Example I was repeated using manganese pentacarbonyl hydride, 21 parts, trifluorochloroethylene, 11 parts, and n-pentane, 68 parts. A pale yellow solid, $HCFCl-CF_2Mn(CO)_5$, 1,2,2-trifluoro-1-chloroethyl manganese pentacarbonyl, M.P. 43–44° C., was obtained in 40 percent yield. The molecular weight, determined isopiestically, was 382 grams per mole. The infrared spectrum, with $CS_2$ and NaCl optics as the solvent, contained strong peaks at 4.92, 4.98, 5.07, 7.46, 7.62, 8.00, 8.81, 9.25, 9.47, 9.98, 10.38 and 14.36 microns.

EXAMPLE IV

*1,2,2-trifluoro-1-chloroethyl manganese pentacarbonyl*

The procedure of Example I was repeated using manganese pentacarbonyl hydride, 4 parts, 1,1,2-trifluoro-2-chloroethylene, 17.5 parts, and tetrahydrofuran, 78.5 parts. The temperature was 25° C., the initial pressure was 6.7 atmospheres and the reaction time was 28 hours. The product, 1,2,2-trifluoro-1-chloroethyl manganese pentacarbonyl, identical to the product formed in Example III, was obtained in 22 percent yield.

EXAMPLE V

*1,1,1,4,4,4-hexafluoro-2-butenyl manganese pentacarbonyl*

The procedure of Example I was repeated using manganese pentacarbonyl hydride, 15.5 parts, 1,1,1,4,4,4-hexafluorobutyne-2, 15.5 parts, and n-pentane, 69 parts. The reaction temperature employed was 25° C. The initial pressure was 4 atmospheres and the reaction time was five days. A pale yellow liquid, M.P. around 0° C., 1,1,1,4,4,4-hexafluoro-2-butenyl manganese pentacarbonyl was prepared in 12.5 percent yield. The product was exclusively composed of the trans isomer. The infrared spectrum obtained using tetrachloroethylene as the solvent and NaCl optics contained strong peaks at 4.72, 4.94, 4.99, 5.08, 6.19, 6.22, 7.81, and 8.9 microns.

EXAMPLE VI

*1,1-dichloro-2,2-difluoroethyl manganese pentacarbonyl*

The procedure of Example I was repeated using manganese pentacarbonyl hydride, 4.0 parts, 1,1-dichloro-2,2-difluoroethylene, 19 parts, and n-pentane, 71.5 parts. The reaction temperature was 25° C., the initial pressure was 5.5 atmospheres and the reaction time was 48 hours. A yellow solid, M.P. 68–70° C., 1,1-dichloro-2,2-difluoroethyl manganese pentacarbonyl, was obtained in 39 percent yield.

Calculated for $C_7HO_5F_2Cl_2Mn$: C, 25.5; H, 0.30; F, 11.5; Mn, 16.3. Found: C, 25.77; H, 0.38, F, 10.1; Mn, 16.3. The infrared spectrum obtained in the same manner as the spectrum described in Example I had strong peaks at 4.93, 4.99, 5.07, 8.13, 10.29 and 12.36 microns.

EXAMPLE VII

*1,1,2,2-tetrafluoroethyl molybdenum (cyclopentadienyl)tricarbonyl*

The procedure of Example I was repeated using cyclopentadienyl molybdenum tricarbonyl hydride, 10.5 parts, tetrafluoroethylene, 10.5 parts, and n-pentane, 79 parts. The reaction temperature was 25° C., the initial pressure was 4 atmospheres, and the reaction time was 16 hours. After sublimation at 65° and 0.1 mm. pressure a yellow orange solid, melting point 54° C., 1,1,2,2-tetrafluoroethyl molybdenum(cyclopentadienyl)tricarbonyl, was obtained in 11 percent yield.

Calculated for $C_{10}H_6O_3F_4Mo$: C, 34.7; H, 1.7; F, 22.0; Mo, 27.7. Found: C, 34.94; H, 1.73; F, 21.91; Mo, 27.48. The melting point, determined isopiestically, was 341 grams per mole. The infrared spectrum obtained in the same manner as the spectrum described in Example I contained strong peaks at 4.90, 5.00, 5.14, 7.38, 8.54, 8.60, 9.11, 9.93, 10.27, 10.90, 12.17 and 12.91 microns.

EXAMPLE VIII

*1,2,2-trifluoro-1-chloroethyl molybdenum (cyclopentadienyl)tricarbonyl*

The procedure in Example I was repeated using cyclopentadienyl molybdenum tricarbonyl hydride, 21 parts, trifluoro chloroethylene, 31 parts, and n-pentane, 48 parts. The temperature of the reaction mixture was maintained at 25° C. The initial pressure was 7 atmospheres and the reaction time was three days. The product, an orange solid melting at 36.5 to 38° C. was 1,2,2-trifluoro-1-chloroethyl molybdenum(cyclopentadienyl)tricarbonyl. It was isolated by sublimation at 65° C. and 0.1 mm. This product was obtained in 4.3 percent yield. The compound is somewhat unstable at room temperature and decomposes slowly (approximately 20 percent per day). The infrared spectrum obtained under the same conditions as the spectrum described in Example I contained strong peaks at 4.87, 5.08, 7.43, 8.72, 9.17, 9.39, 10.45, 12.14, 12.88 and 13.25 microns. The peak occurring at 5.08 microns was broad and could possibly have been resolved to two or more components.

EXAMPLE IX

*1,1,2,2-tetrafluoroethyl tungsten (cyclopentadienyl)tricarbonyl*

The procedure of Example I was repeated using cyclopentadienyl tungsten tricarbonyl hydride, 15 parts, tetrafluoroethylene, 24 parts, and n-pentane, 61 parts. The reaction temperature was 60° C., the original pressure was 8 atmospheres and the time of the reaction was 28 hours. The product obtained by sublimation at 65° C. and 0.1 mm. pressure was a yellow orange solid, melting point 50–51° C., and was identified as 1,1,2,2-tetrafluoroethyl tungsten(cyclopentadienyl)tricarbonyl.

EXAMPLE X

*Bis(1,2,2-trifluoro-1-chloroethyl)iron tetracarbonyl*

The procedure in Example I is repeated using iron carbonyl dihydride, 18 parts, difluoro chloroethylene, 25 parts, and n-pentane, 57 parts. The reaction temperature is 125° C., the initial pressure is 6 atmospheres and the time of the reaction is 24 hours. The product, bis(1,2,2-trifluoro-1-chloroethyl)iron tetracarbonyl is a pale yellow. The infrared spectrum obtained under the same conditions as the spectrum obtained in Example V contains strong bands at 4.64, 4.78, 7.43, 8.53, 9.13 and 10.22 microns.

Other fluorocarbon transition metal compounds can be prepared according to the conditions enumerated in the following table.

TABLE I

| Metal Hydride | Fluoro-carbon | Solvent | Product | Temperature | Initial Pressure | Time |
|---|---|---|---|---|---|---|
| $(C_5H_5)_2TaH_3$ | $CF_2=CF_2$ | n-Pentane | $(HCF_2-CF_2)_3Ta(C_5H_5)_2$ | 25° | 6 | 6 days. |
| Tert.butyl-C$_5$H$_4$Cr(CO)$_3$H | $CF_2=CF_2$ | n-Hexane | $HCF_2-CF_2-Cr(tert-butyl\ C_5H_4)(CO)_3$ | 15° | 10 | 7 days. |
| $CH_3$-C$_5$H$_4$Mo(CO)$_3$H | $CF_2=CFCl$ | Petroleum ether | $HCFCl-CF_2-Mo(C_5H_4CH_3)(CO)_3$ | 25° | 4 | 6 days. |
| $(C_5H_5)_2MoH_2$ | $CF_2=CFCl_2$ | n-Pentane | $(C_5H_5)_2Mo(CF_2-CCl_2)_2$ | 25° | 6 | 24 hrs. |
| $(C_5H_5)_2W\ H_2$ | $CF_3-C\equiv C-CF_3$ | Isooctane | $(C_5H_5)_2W(C(CF_3H)=C-CF_3)_2$ | 25° | 6 | 65 hrs. |
| $[C_4H_9\text{-indenyl}]W(CO)_3H$ | $CF_2=CF_2$ | n-Pentane | $HCF_2-CF_2-W[CH_9\text{-indenyl}](CO)_3H$ | 25° | 7 | 24 hrs. |
| $HRe(CO)_5$ | $CF_2=CF_2$ | do | $HCF_2-CF_2-Re(CO)_5$ | 60° | 0.3 | 28 hrs. |
| $(C_5H_5)_2ReH$ | $CF_2=CF_2$ | do | $HCF_2-CF_2-Re(C_5H_5)_2$ | 25° | 5 | 24 hrs. |
| $CH_3-C_5H_4-Fe(CO)_2H$ | $CF_2=CCl_2$ | n-Hexane | $HCCl_2-CF_2-Fe(CH_3-C_5H_4)(CO)_2$ | 25° | 8 | 10 hrs. |
| $H_2Ru(CO)_4$ | $CF_2=CFCl$ | n-Pentane | $(CHFCl-CF_2)_2Ru(CO)_4$ | 25° | 8 | 28 hrs. |
| $H_2Os(CO)_4$ | $CF_2=CF_2$ | do | $(HCF_2-CF_2)_2Os(CO)_4$ | 60° | 7 | 24 hrs. |
| $HCo(CO)_4$ | $CF_2=CF_2$ | do | $HCF_2-CF_2-Co-(CO)_4$ | 80° | 0.3 | 26 hrs. |
| $HRh(CO)_4$ | $CF_2=CF_2$ | do | $HCF_2-CF_2-Rh-(CO)_4$ | 25° | 4 | 28 hrs. |
| $HIr(CO)_4$ | $CF_2=CFCl$ | do | $HCFCl-CF_2-Ir(CO)_4$ | 25° | 3 | 27 hrs. |
| $[(C_2H_5)_3P]_2Pd(H)Cl$ | $CF_2=CF_2$ | do | $HCF_2-CF_2-Pd(Cl)[P(C_2H_5)_3]$ | 25° | 6 | 28 hrs. |
| $[(C_6H_5)_3P]Pt(H)Cl$ | $CF_2=CF_2$ | do | $HCF_2-CF_2Pt(Cl)[P(C_6H_5)_3]$ | 25° | 6 | 25 hrs. |

Nuclear magnetic resonance spectrophotometry demonstrates that in all the compounds produced by our process, a $CF_2$ is adjacent to the metal atom. This phenomena is exhibited when unsymmetrical fluorinated hydrocarbons are used in our process.

Our new compounds are useful antiknocks when added to petroleum hydrocarbons. Further, they may be used as supplemental antiknocks in addition to a lead antiknock already present in the fuel. Typical lead antiknocks are the lead alkyls such as tetraethyllead, tetrabutyllead, tetramethyllead and various mixed alkyls such as dimethyldiethyllead, diethyldibutyllead and the like. When used as a supplemental antiknock, our compounds also act as a scavenger in combination with typical halogen scavengers such as ethylene dichloride, ethylene dibromide and the like.

Our novel compounds are not only useful intermediates as shown above but are further useful in their own right in metal plating applications. In order to effect metal plating with our novel compounds, they are decomposed in an evacuated space containing the object to be plated. On decomposition, they lay down a film of metal on the object contained within the enclosure. The gaseous plating may be carried out in the presence of an inert gas so as to prevent oxidation of the metal during the plating operation.

The gaseous plating technique described above finds wide application in forming coatings which are not only decorative but also protect the underlying substrate material. Since molybdenum is a conductor, this technique enables the preparation of printed circuits which find wide application in the electrical arts.

Deposition of metal on a glass cloth illustrates the applied processes. A glass cloth band weighing one gram is dried for one hour in an oven at 150° C. and dipped in one of our compounds. The tube is heated at 400° C. for one hour after which time the tube is cooled and opened. The cloth has a metallic grey appearance and exhibits a gain in weight of about 0.02 gram. The cloth has greatly decreased resistivity and each individual fiber proves to be a conductor. An application of current to the cloth causes an increase in its temperature. Thus, a conducting cloth is prepared. This cloth can be used to reduce static electricity, for decoration, for thermal insulation by reflection and as a heating element.

Our new compounds also find utility as additives for lubricant oils, and greases to increase their antiwear activity. They are also used to control the rate of combustion of pyrophoric materials such as solid rocket propellants. Our compounds are also biocidally active and find utility as fungicides, herbicides, pesticides and the like. Our compounds are also utilizable as monomers in the preparation of polymeric materials.

Having fully described our novel compounds, their novel mode of preparation, and their manifold utilities, we desire to be limited only within the scope of the appended claims.

We claim:
1. New compounds having the formula

$$[R]_a[R']_b M[CO]_c[R''_3P]_d$$

wherein R, R', CO, and $R''_3P$ are radicals bonded to the metal atom M, and R is a fluorocarbon radical selected from the class consisting of $$HCF_2-CF_2-,\ HCFCl-CF_2-,\ HCCl_2-CF_2-,\ CF_3-CH=C-\underset{CF_3}{|}$$

R' is a cyclopentadienyl radical selected from the class consisting of the cyclopentadienyl radical and hydrocarbon substituted cyclopentadienyl radicals having 6 to 13 carbon atoms which embody a ring of 5 carbon atoms having the general configuration found in cyclopentadiene, M is a metal selected from the class consisting of Groups VB, VIB, and VIII of the Periodic Table, and R'' is selected from the class consisting of halogen and alkyl, cycloalkyl, aryl, alkaryl, and aralkyl hydrocarbon radicals having from one to about 13 carbon atoms; $a$, $b$, $c$, and $d$ are integers such that $a=1$ to 3, $b=0$ to 2, $c=0$ to 5, and $d=0$ to 2, the values of $a$, $b$, $c$, and $d$ being such that the sum of all the electrons coordinated to the metal and the atomic number of the metal is equal to the atomic number of the next higher inert gas.

2. Process for the formation of new compounds of the Group VB, VIB, VIIB, and VIII metals of the Periodic Table which comprises reacting:
(a) an unsaturated fluorinated hydrocarbon selected from the class consisting of tetrafluoroethylene, trifluorochloroethylene, 1,1-difluoro-2,2-dichloroethylene, and 1,1,1,4,4,4-hexafluorobutyne-2, with
(b) a hydride of a Group VB, VIB, VIIB, and VIII metal having the formula $$[R'_b M[CO]_c [R''_3 P]_d [H]_e$$

wherein R' is a cyclopentadienyl radical selected from the class consisting of the cyclopentadienyl radical and hydrocarbon substituted cyclopentadienyl radicals having 6 to 13 carbon atoms which embody a ring of 5 carbon atoms having the general configuration found in cyclopentadiene, M is a metal of Group VB, VIB, VIIB, VIII of the Periodic Table, R'' is selected from the class consisting of halogen, and alkyl, cycloalkyl, aryl, alkaryl, and aralkyl hydrocarbon radicals having from one to about 13 carbon atoms; $b$, $c$, $d$ and $e$ are integers such that $b=0$ to 2, $c=0$ to 5, $d=0$ to 2, and $e=1$ to 3, the values of $b$, $c$, $d$, and $e$ being such that the sum of all the electrons coordinated to the metal and the atomic number of the metal is equal to the atomic number of the next higher inert gas, said process being carried out at a temperature of 0 to 80° C., and at a pressure of 0.3 to 10 atmospheres for 5 hours to 7 days.

3. 1,1,2,2-tetrafluoroethyl tungsten (cyclopentadienyl) tricarbonyl.

4. 1,1,2,2-tetrafluoroethyl molybdenum(cyclopentadienyl)tricarbonyl.

5. Process for the formation of 1,2,2-trifluoro-1-chloroethyl molybdenum(cyclopentadienyl) tricarbonyl, wherein trifluorochloroethylene is reacted with cyclopentadienyl molybdenum tricarbonyl hydride in the presence of n-pentane, said process being carried out at 25° C. and at an initial pressure of 7 atmospheres for three days.

6. Process for the preparation of 1,1,2,2-tetrafluoroethylmanganese pentacarbonyl, said process comprising reacting tetrafluoroethylene with manganese carbonyl hydride at a temperature within the range of 0° to 80° C. and at a pressure within the range of 0.3 to 10 atmospheres for 5 hours to 7 days.

7. Process for the preparation of 1,2,2-trifluoro-1-chloroethyl manganese pentacarbonyl, said process comprising reacting manganese pentacarbonyl hydride with trifluoro chloroethylene at a temperature within the range of 0° to 80° C. and at a pressure within the range of 0.3 to 10 atmospheres for 5 hours to 7 days.

8. Process for the preparation of 1,1,1,4,4,4-hexafluoro-2-butenyl manganese pentacarbonyl, said process comprising reacting 1,1,1,4,4,4-hexafluorobutyne-2 with manganese pentacarbonyl hydride at a temperature within the range of 0° to 80° C. and at a pressure within the range of 0.3 to 10 atmospheres for 5 hours to 7 days.

9. Process for the preparation of 1,1-dichloro-2,2-difluoroethyl manganese pentacarbonyl, said process comprising reacting 1,1-dichloro-2,2-difluoroethylene with manganese pentacarbonyl hydride at a temperature within the range of 0° to 80° C. and at a pressure within the range of 0.3 to 10 atmospheres for 5 hours to 7 days.

10. Process for the preparation of 1,1,2,2-tetrafluoroethyl molybdenum (cyclopentadienyl) tricarbonyl, said process comprising reacting tetrafluoroethylene with cyclopentadienyl molybdenum tricarbonyl hydride at a temperature within the range of 0° to 80° C. and at a pressure within the range of 0.3 to 10 atmospheres for 5 hours to 7 days.

11. Process for the preparation of 1,2,2-trifluoro-1-chloroethyl molybdenum (cyclopentadienyl) tricarbonyl, said process comprising reacting trifluoro chloroethylene with cyclopentadienyl molybdenum tricarbonyl hydride at a temperature within the range of 0° to 80° C. and at a pressure within the range of 0.3 to 10 atmospheres for 5 hours to 7 days.

12. Process for the preparation of 1,1,2,2-tetrafluoroethyl tungsten (cyclopentadienyl) tricarbonyl, said process comprising reacting cyclopentadienyl tungsten tricarbonyl hydride with tetrafluoroethylene at a temperature within the range of 0° to 80° C. and at a pressure within the range of 0.3 to 10 atmospheres for 5 hours to 7 days.

13. Process for the preparation of bis(1,2,2-trifluoro-1-chloroethyl) iron tetracarbonyl, said process comprising reacting difluoro chloroethylene with iron carbonyl dihydride at a temperature within the range of 0° to 80° C. and at a pressure within the range of 0.3 to 10 atmospheres for 5 hours to 7 days.

14. The process of claim 2 carried out in a non-reactive organic solvent.

15. 1,2,2-trifluoro-1-chloroethyl molybdenum (cyclopentadienyl) tricarbonyl.

16. Compounds having the formula:

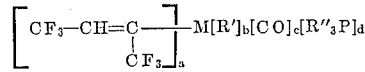

wherein R', CO and R''$_3$P are radicals bonded to the metal atom M and R' is a cyclopentadienyl radical selected from the class consisting of the cyclopentadienyl radical and hydrocarbon substituted cyclopentadienyl radicals having 6 to 13 carbon atoms which embody a ring of 5 carbon atoms having the general configuration found in cyclopentadiene, M is a metal selected from the class consisting of Groups VB, VIB, and VIII of the Periodic Table, and R'' is selected from the class consisting of halogen and alkyl, cycloalkyl, aryl, alkaryl, and aralkyl hydrocarbon radicals having from one to about 13 carbon atoms; $a$, $b$, $c$, and $d$ are integers such that $a=1$ to 3, $b=0$ to 2, $c=0$ to 5, and $d=0$ to 2, the values of $a$, $b$, $c$ and $d$ being such that the sum of all the electrons coordinated to the metal and the atomic number of the metal is equal to the atomic number of the next higher inert gas.

17. Bis(1,2,2-trifluoro-1-chloroethyl) iron tetracarbonyl.

References Cited by the Examiner
UNITED STATES PATENTS
3,050,562  8/1962  Klopfer _____ 260—429

FOREIGN PATENTS
1,214,952  11/1959  France.
874,618  8/1961  Great Britain.

OTHER REFERENCES
Watterson et al.: "Chem. and Ind.," Oct. 29, 1960 (p. 1358).

TOBIAS E. LEVOW, *Primary Examiner.*

W. J. VAN BALEN, A. DEMERS, *Assistant Examiners.*

UNITED STATES PATENT OFFICE
CERTIFICATE OF CORRECTION

Patent No. 3,290,343                          December 6, 1966

Francis G. A. Stone et al.

It is hereby certified that error appears in the above numbered patent requiring correction and that the said Letters Patent should read as corrected below.

Column 3, line 39, for "molybdenum," read -- molybdenum --; columns 7 and 8, in TABLE I, fourth column, under the heading "Product", line 6 thereof, for that portion of the Table reading:

$$\underset{|}{CH}_9 \quad\quad\quad \text{read} \quad\quad\quad \underset{|}{C_4H}_9$$

Signed and sealed this 26th day of September 1967.

(SEAL)
Attest:

ERNEST W. SWIDER                                 EDWARD J. BRENNER
Attesting Officer                                          Commissioner of Patents